Sept. 25, 1962 W. ROTH 3,055,067
METHOD AND APPARATUS FOR MANUFACTURING
SEMI-FINISHED METALLIC PRODUCTS
Filed Jan. 7, 1960 7 Sheets-Sheet 1

*Inventor:*
WALTER ROTH
By Toulmin & Toulmin
*Attorneys*

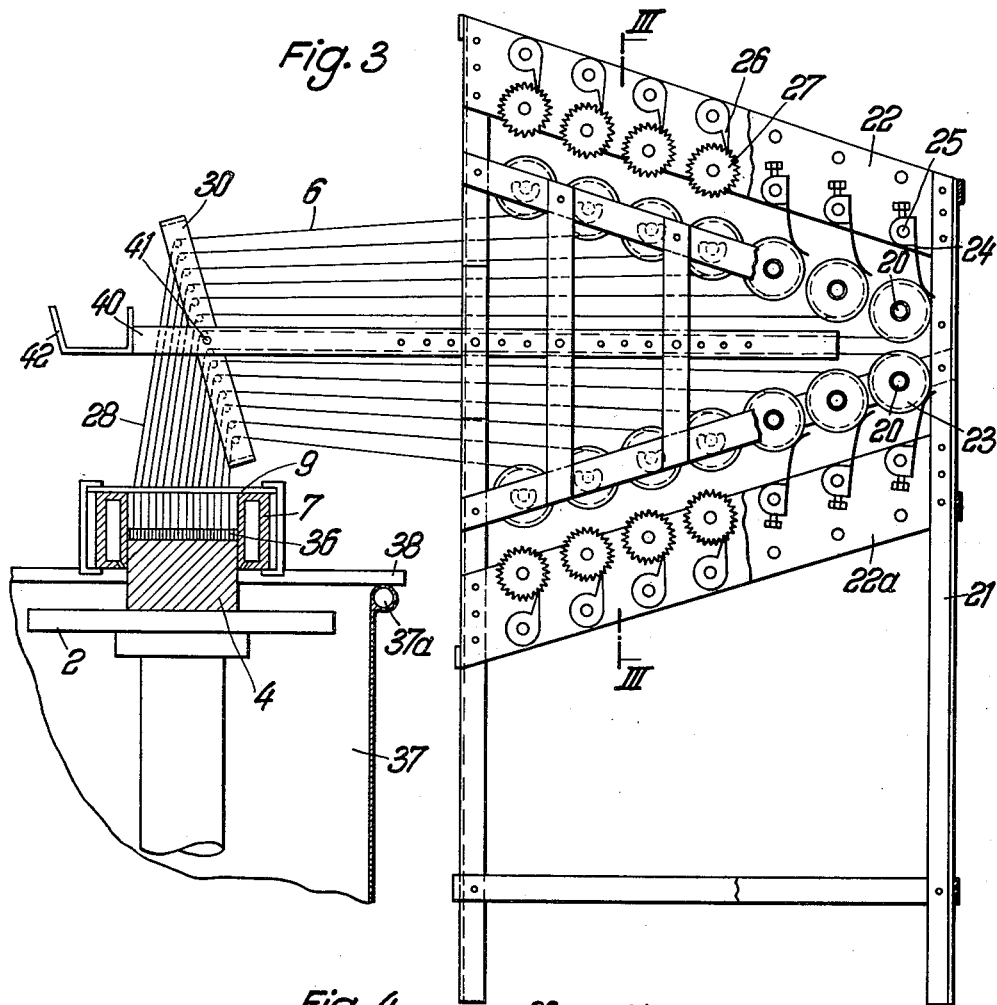
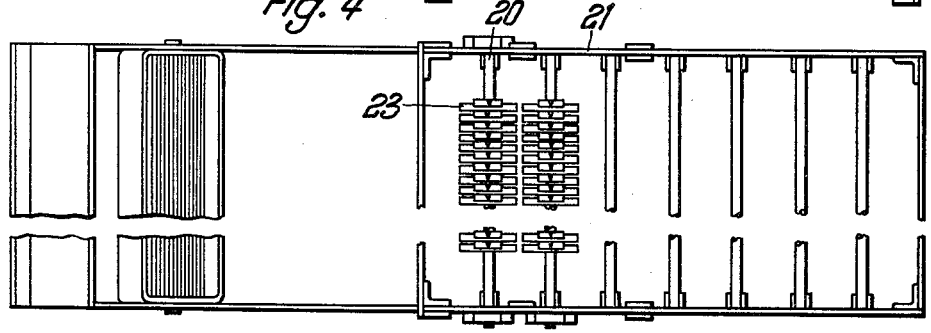

Inventor:
WALTER ROTH

Inventor:
WALTER ROTH
By Toulmin & Toulmin
Attorneys

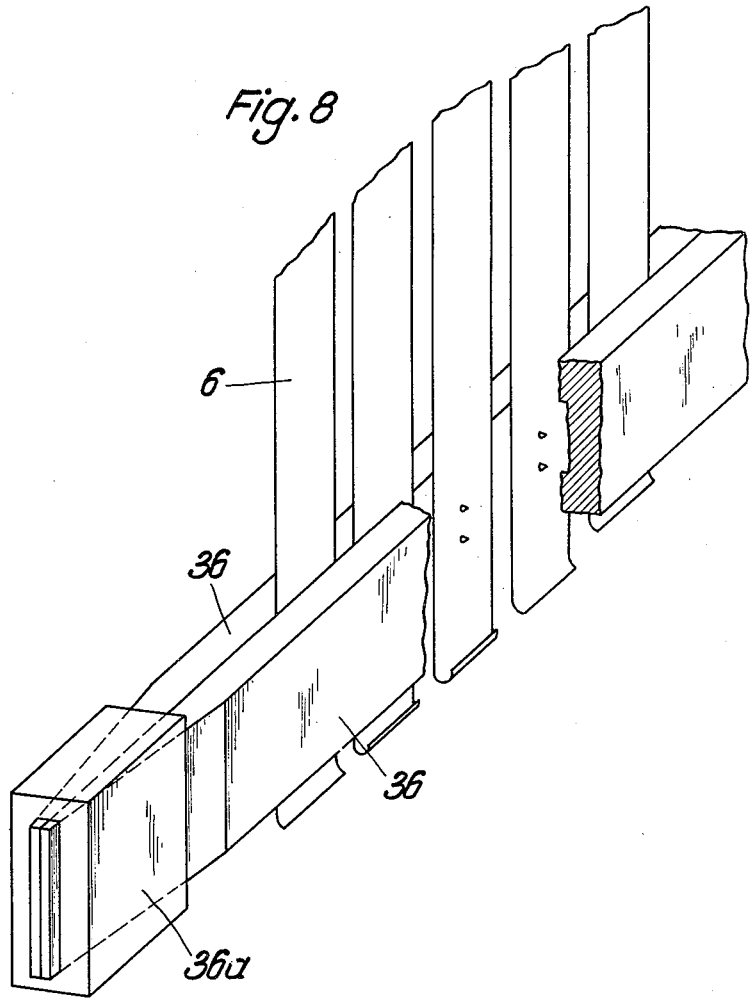

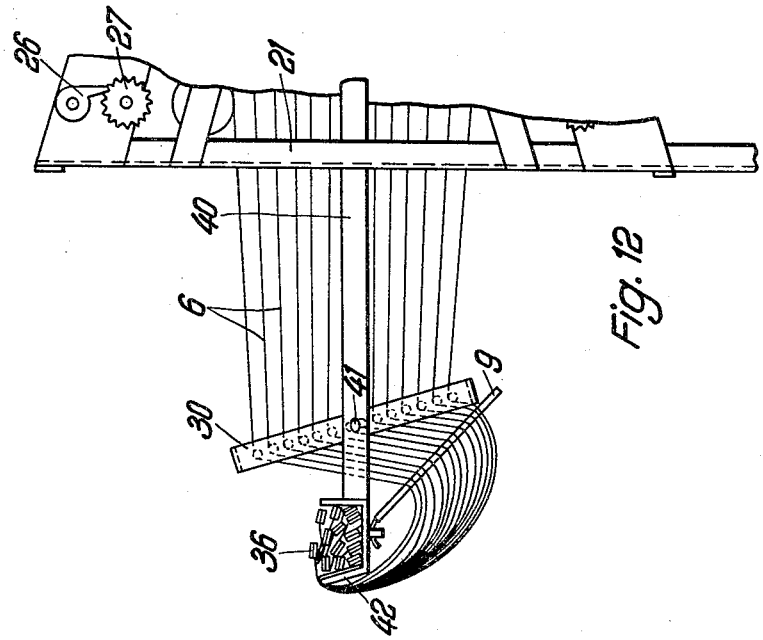
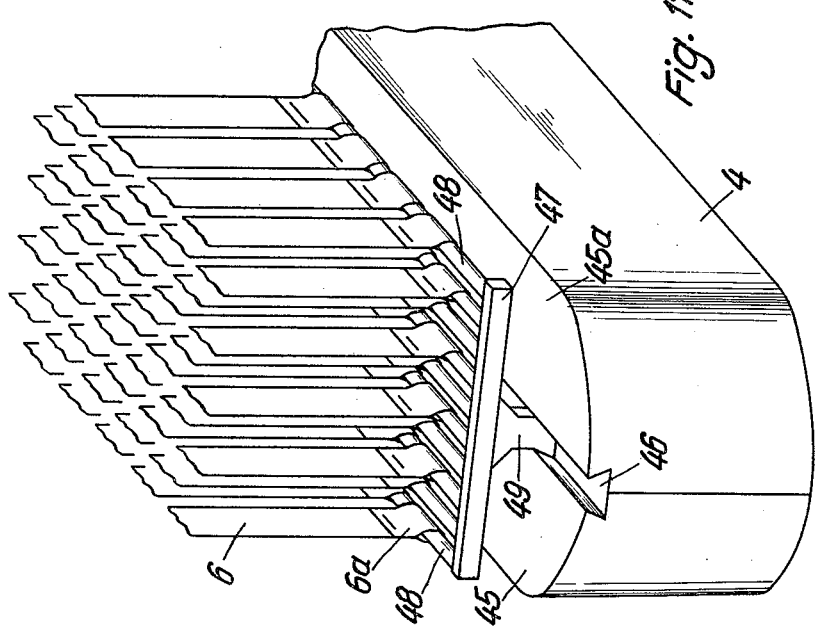

United States Patent Office 3,055,067
Patented Sept. 25, 1962

3,055,067
METHOD AND APPARATUS FOR MANUFACTURING SEMI-FINISHED METALLIC PRODUCTS
Walter Roth, Bonn (Rhine), Germany, assignor to Vereinigte Leichtmetall-Werke Gesellschaft mit beschränkter Haftung, Bonn, Germany
Filed Jan. 7, 1960, Ser. No. 1,075
Claims priority, application Germany Jan. 9, 1959
8 Claims. (Cl. 22—57.2)

The present invention relates to a method and an apparatus for manufacturing semi-finished metallic products such as rolled, forged, die-forged, or pressed articles.

The present invention is a continuation-in-part of the co-pending patent application Serial No. 704,103, filed December 20, 1957, entitled "Method for Manufacturing Semi-Finished Metallic Products," and assigned to the same assignee as the instant application.

The co-pending application describes a method for manufacturing semi-finished metallic products, particularly from light metal, according to which a continuous or semi-continuous, either indirectly shielded or directly shielded, preferably "water-cast" ingot is produced; during the casting of the ingot there is introduced into the latter from the liquid end thereof a separating element or elements in form of plates, bands, strips or the like rigid or deformable material which does not combine with the ingot metal by welding or alloying, but remains mechanically separable therefrom; the separating element or elements are introduced substantially in the direction of movement of the continuous or semi-continuous ingot and create separating strips or planes in the interior of the ingot, along which strips or planes the metal on both sides thereof can be partly or completely separated before or after a further processing of the ingot, containing the aforesaid separating strips or planes, by rolling or extrusion, die-forging or pressing.

While the aforementioned process constitutes a considerable progress over the art, it has been found that there is room for further improvement. In particular, it has been found that the predetermined position of the separating bands is occasionally changed under the influence of the moving liquid molten metal, causing a considerable waste of non-utilizable semi-finished articles.

Accordingly, it is a general object of the present invention to provide a method and an apparatus for producing semi-finished metallic products constituting an improvement over the method discussed in the co-pending application, supra, and in particular, removing the aforementioned disadvantage, and resulting in a greater output of useful semi-finished products.

This object as well as further objects and advantages of the present invention which will become apparent as the description proceeds, are achieved by the method and the apparatus of the present invention. According to the method of the present invention the separating elements are pretensioned after being introduced into the mold, but before the casting begins. According to a further advantageous feature, the separating elements are passed through guide means prior to being introduced into the mold.

According to a first embodiment of the apparatus of the invention support means and resilient means are provided for resiliently suspending the separating elements and, furthermore, connecting means are provided for connecting the ends opposite to the resiliently suspending ends of the elements with the bottom portion of an ingot mold. The support and resilient means can be mounted on a frame which, in turn, is mounted, in upright position, on a drop-plate of the casting unit and is lifted and lowered therewith. Furthermore, means can be provided for adjusting the length of the frame, thereby varying the tension of the separating elements.

According to another, preferred embodiment of the apparatus of the invention there is provided a plurality of rotating feed rolls from which the separating elements can be wound off and control means are associated with the rolls for adjusting the tension of the separating elements, which are again equipped with connecting means, indirectly connecting them with the bottom portion of the ingot mold and, if desired, guide means disposed directly above the mold. The control means may consist, for example, of locking pawl, ratchet, and spring means.

The means for connecting the separating elements indirectly with the bottom portion of a mold may consist of a plurality of flat bars, with the ends of the separating elements being clamped in between every two of these flat bars, the flat bars being disposed adjacently in a recess of the bottom portion of the mold. They can also consist of a grid provided in a recess of the bottom portion of the mold, the ends of the separating elements being detachably connected with the grid.

Reference is made to the description in the co-pending patent application, supra, as far as details of structure and operation not claimed in the present invention are concerned.

FIGURE 3 is a lateral view of another embodiment of the apparatus of the invention comprising means for tensioning and guiding the separating elements;

FIGURE 4 is a cross-sectional view of the apparatus shown in FIGURE 3 taken along lines III—III in FIGURE 2;

FIGURE 8 is a perspective view of means for connecting the separating elements with the bottom of the ingot mold as used in the apparatus of FIGURE 1 or FIGURES 3 and 4;

FIGURE 11 is a perspective view of another type of the bottom portion of an ingot mold with separating elements and another type of connecting means in the apparatus of the invention;

FIGURE 12 is a lateral view of part of the apparatus shown in FIGURE 3, in the inoperative position but prepared for a casting operation.

Figure 1:
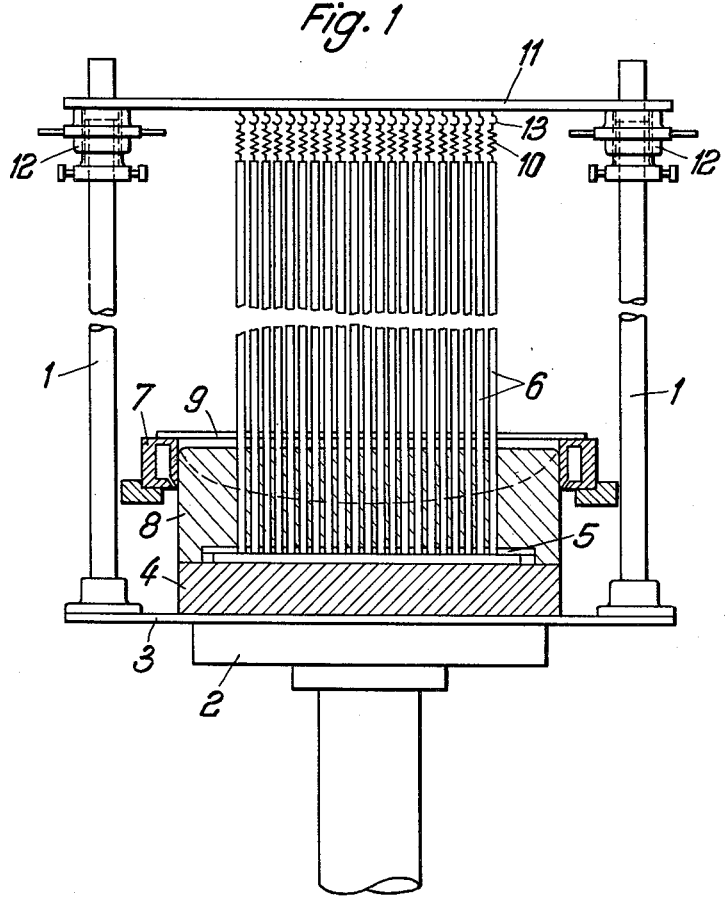
FIGURE 1 is a lateral view of an embodiment of the apparatus of the invention comprising means for tensioning and guiding the separating elements.

Referring first to the embodiment of the invention shown in FIGURE 1, the apparatus comprises a frame having support columns 1 mounted on drop-plate 2 of a continuous casting unit and moving downwardly together with the drop-plate during the casting operation. The columns 1 are connected with a base plate 3 which latter supports the bottom 4 of an ingot mold 7. Reference number 8 designates the ingot in the process of casting. According to the invention there are provided separating members, for example bands or strips of glass fabric, and connecting means described in greater detail further below, for indirectly connecting the separating elements with the bottom portion 4 of the ingot mold 7. Furthermore, directly above the top surface of the molten material guide means are provided for the separating members, which are also described in greater detail further below.

According to the invention the strips 6 are pre-tensioned. This can be done by means of springs 10 suspended from the hooks 13 of a transverse bar 11. The transverse bar 11 is provided at the upper end of columns 1 and is equipped with adjusting screw means 12 with which bar 11 can be displaced so as to adjust the pre-tensioning of the strips prior to the casting operation and, if necessary, readjust the same during the casting. During the casting, the strips thus travel downwardly together with the bottom portion 4 of the ingot mold and are then surrounded by the molten metal and then further processed as described in the co-pending application, supra.

Figure 5:
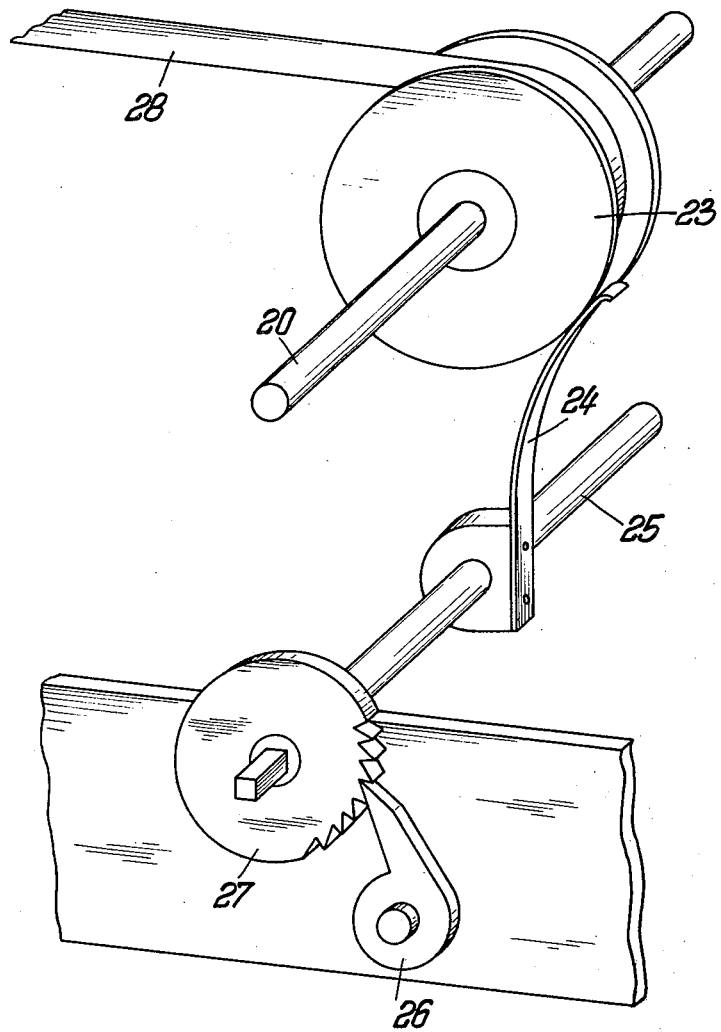
FIGURE 5 is a perspective view of the tensioning means in the apparatus of FIGURES 3 and 4.

Whereas the aforedescribed embodiment of the apparatus of the invention is particularly suitable for a frequently changing production program, another, preferred embodiment of the apparatus of the invention will next be described, which is highly advantageous for mass production under a constant production program and for a highly effective continuing operation. As shown in FIGURES 3 and 4 a frame 21 has lateral support sheets 22, 21a, extending obliquely relative to one another and bearing a plurality of shafts 20, for example seven shafts, supported by each sheet. Every shaft supports a plurality of feed rolls 23, as, for example thirty, or thirty-one feed rolls (see FIGURE 4) so that the entire unit has, for example, 427 feed rolls on which the strips or bands are coiled up. Further shafts 25, support blade springs 24 and locking pawls 26 cooperate with ratchet wheels 27, adapted to urge blade springs 24 with various degrees of pressure against feed rolls 23 (see FIGURE 5). During the casting operation and the lowering of drop-plate 2 the blade springs 24 exert a braking effect on the strips 6, thereby maintaining the same tension. The strips 6 are guided over a deviating frame 30, pivotably mounted on a bar 40 about pivot 41 and are provided with guide means 9 and means for indirectly connecting the ends of the strips with the bottom portion 4 of ingot mold 7. 2 designates again a drop-plate and 37 designates a casting vessel, the upper portion 37a of which supports bars 38, supporting the ingot mold 7. At the outermost end of bar 40 a receptacle 42 is provided for receiving the means for indirectly connecting the ends of the strips with the bottom of the ingot mold.

Figure 2:
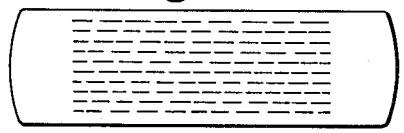
FIGURE 2 is a cross-sectional view of an ingot with separating elements therein.
Figure 6:
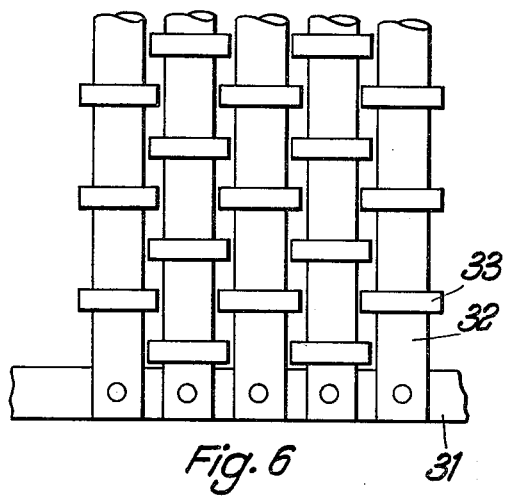
FIGURE 6 is a plan view of a portion of guide means for separating elements in the apparatus of FIGURE 1 or FIGURES 3 and 4.
Figure 7:
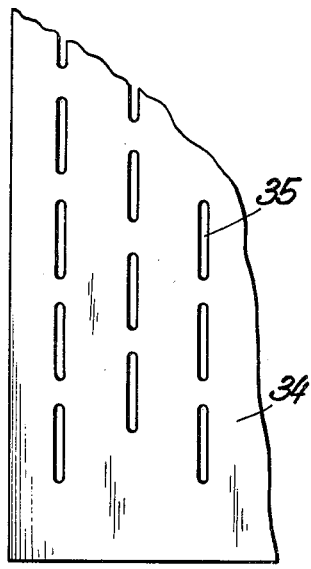
FIGURE 7 is a plan view of a portion of another type of guide means for separating elements in the apparatus of FIGURE 1 or FIGURES 3 and 4.
Figure 9:
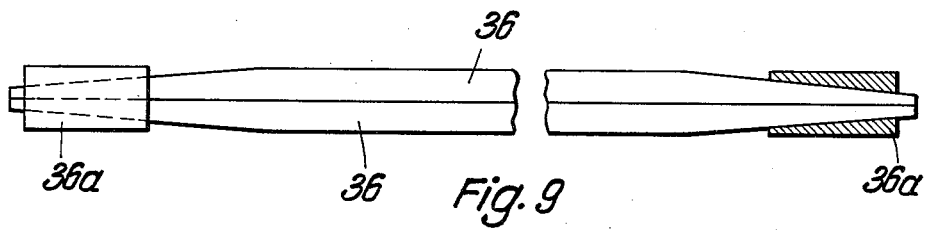
FIGURE 9 is a side elevational view of the connecting means of FIGURE 8.

The guide means 9 for the separating elements can consist, for example, of a bar provided with a plurality of slots through which the strips are passed as, for example, bars 32 having slots 33 mounted on a frame 31. It is also possible to provide a plate 34 having slots 35 (see FIGURES 6 and 7). The guide means 9 are mounted at the upper end of ingot mold 7 as shown in FIGURES 1 and 2, so as to avoid displacement of the guide means during the casting operation.

The means for indirectly connecting the strips 6 with the bottom portion 4 of ingot mold 7 can consist, for example, of flat bars 36 provided in pairs between which the strips 6 are clamped. The flat bars 36 can be conically shaped and held together by blocks 36a at the respective ends of the flat bars. To provide an even better attachment the interior surfaces of the flat bars 35 may have fine grooves. The flat bars hold the strips 6 safely spaced at predetermined distances from one another. As a further safety measure the ends of the strips can be secured with clamps or the like to prevent them from slipping out of the flat bars.

Figure 10:
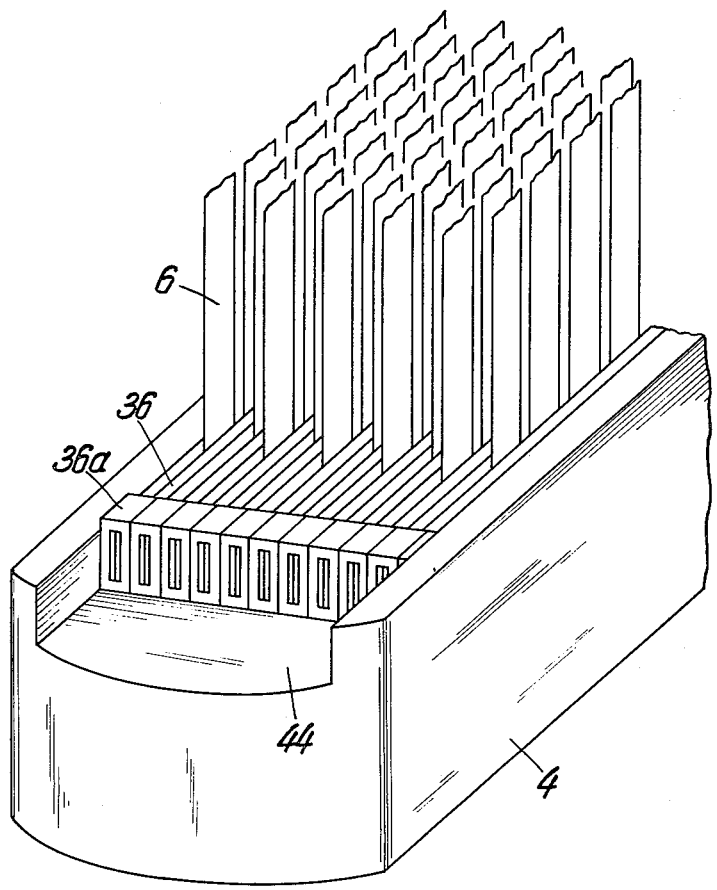
FIGURE 10 is a perspective view of the bottom portion of an ingot mold with the separating elements and connecting means in the apparatus of the invention.

The flat bars are placed adjacently in a recess 44 of the bottom portion 4 of the ingot mold (see FIGURE 10). It is, however, also possible to provide an ingot bottom 4 of the type shown in FIGURE 11 having a longitudinal dovetail-shaped recess 46 receiving a correspondingly shaped rail 49 attached to a frame 47 having longitudinal bars 48 about which latter the ends of the strips 6 are guided, so as to form loops 6a, thereby connecting the strips 6 directly with the bars 48 and indirectly with mold bottom 4.

Prior to the casting operation the guide means 9 are suspended below receptacle 42 and the end portions of the strips 6 with the connecting members 36 are placed in the receptacle 42. The end portions of the strips 6 with the connecting members 36 are then placed into the bottom portion 4 of ingot mold 7 as shown, for example, in FIGURES 10 and 11, and are pretensioned either by the springs 10 suspended from transverse bar 11, as shown in FIGURE 1, or by the blade springs 24 braking the rolls 23 according to the embodiment shown in FIGURE 3. In the last-mentioned embodiment the pre-tension is simply effected by turning the rolls 23 until the strips 6 are tensioned. The liquid metal is then introduced into the ingot mold. The even distribution of the molten metal can be improved by selecting a casting temperature which is somewhat higher than the temperature used in conventional continuous casting operations. The ingot cast according to the process and with the apparatus of the invention can have any desired length.

A length of about 2 to 3 meters ha proved to be quite practical. After the casting, the guide means 9 are removed from the ingot mold and in the area above the mold the strips are clamped by further connecting means such as flat bars 36 and are cut off below the flat bars. The new ends of the continuous strips with the newly attached flat bars are then in the receptacle 42 to await a further casting. The ingot mold is removed and the cast ingot is removed therefrom. The flat bars below the ingot can be easily removed since they are outside of the ingot. Thereupon the ingot can be placed in its previous position for a further casting operation. If, instead of the flat bars a grid of the type shown in FIGURE 11 is used as connecting means, the lower portion of the ingot is separated and the grid is molten out of this separated end portion of the ingot.

It will be understood that this invention is susceptible to modification in order to adapt it to different usages and conditions and, accordingly, it is desired to comprehend such modifications within this invention as may fall within the scope of the appended claims.

What I claim is:

1. In the method for manufacturing semi-finished metallic articles comprising the steps of casting ingots through a mold being open at the top and at the bottom and withdrawing the growing solidifying ingot through the bottom opening of the mold, introducing through the top opening of the mold and in the direction substantially the same as the direction of movement of the continuous ingot at least one separating element of heat resistant, non-metallic material, crackable under translational pressure and thereby generating separating zones in the continuous ingot; the step of pretensioning said separating element after having been introduced into said mold and prior to the casting operation.

2. An apparatus for casting metallic ingots comprising a plurality of continuous separating elements of heat resistant, non-metallic material to be embedded in said ingots, a mold having a top and a bottom opening, a bottom closing said bottom opening, a drop plate for lifting and lowering said bottom portion, support means and resilient means for resiliently suspending said separating elements, and connecting means for connecting said separating elements with said bottom portion.

3. Apparatus as described in claim 2, comprising a frame mounted on said drop plate in upright-position, said support and resilient means being mounted on said frame.

4. An apparatus for casting metallic ingots comprising a plurality of continuous separating elements of heat resistant, non-metallic material to be embedded in said ingots, a mold having a top and a bottom opening, a bottom closing said bottom opening, a drop plate for lifting and lowering said bottom portion, support means and resilient means for resiliently suspending said separating elements, and connecting means for connecting said separating elements with said bottom portion, and guide means disposed above said mold for maintaining said separating elements in spaced relationship relative to one another.

5. Apparatus as described in claim 3, further comprising adjusting screw means on said frame for lifting and lowering said frame, thereby varying the tension of said separating elements.

6. An apparatus for casting metallic ingots comprising a plurality of continuous separating elements of heat resistant, non-metallic material to be embedded in said ingots, a mold having a top and a bottom opening, a bottom closing said bottom opening, a drop plate for lifting and lowering said bottom portion, a plurality of rotatable feed rolls with said separated elements being supplied therefrom, connecting means for connecting said separating elements with said bottom portion, and resilient braking means braking the movement of said feed rolls, thereby causing said separating elements to become pretensioned whenever wound off said feed rolls.

7. Apparatus as described in claim 6, said connecting means comprising a plurality of flat bars, said separating elements being clamped in between every two of said flat bars, and a recess in said bottom portion, said flat bars being disposed adjacently in said recess.

8. Apparatus as described in claim 6, with a dovetail-shape longitudinal channel in said bottom portion, said connecting means consisting of a grid having a plurality of bars with which said separating elements are connected and dovetail-shaped guide means fitting into said longitudinal channel of said bottom portion.

References Cited in the file of this patent

UNITED STATES PATENTS

| 2,148,391 | McBride | Feb. 21, 1939 |
| 2,950,512 | Wilkins | Aug. 30, 1960 |

FOREIGN PATENTS

| 512,953 | Great Britain | Sept. 29, 1939 |
| 54,570 | Holland | Apr. 16, 1943 |